United States Patent
Strobel

(10) Patent No.: US 7,210,892 B2
(45) Date of Patent: May 1, 2007

(54) STACKING COLUMN

(75) Inventor: Gustay Strobel, Bad Saulgau (DE)

(73) Assignee: MTS Maschinenbau, GmbH, Mengen (DE)

( * ) Notice: Subject to any disclaimer, the term of this patent is extended or adjusted under 35 U.S.C. 154(b) by 0 days.

(21) Appl. No.: 10/493,731

(22) PCT Filed: Oct. 18, 2002

(86) PCT No.: PCT/EP02/11701

§ 371 (c)(1),
(2), (4) Date: Apr. 26, 2004

(87) PCT Pub. No.: WO03/035517

PCT Pub. Date: May 1, 2003

(65) Prior Publication Data

US 2005/0035691 A1    Feb. 17, 2005

(30) Foreign Application Priority Data

Oct. 25, 2001  (DE) ............................... 101 52 046

(51) Int. Cl.
*B65B 35/50* (2006.01)
*A47F 5/08* (2006.01)

(52) U.S. Cl. ................. 414/788.1; 211/150; 211/41.1; 414/794.9; 414/795

(58) Field of Classification Search .. 414/788.1–788.3, 414/788, 788.7, 788.9, 789.2, 793.6, 793.8, 414/794.1; 312/35, 42; 211/150, 41.1, 59.4, 211/149, 13.1, 59.3

See application file for complete search history.

(56) References Cited

U.S. PATENT DOCUMENTS

| 4,712,691 | A | * | 12/1987 | Grill et al. | 211/49.1 |
| 5,217,121 | A | * | 6/1993 | Walker | 211/41.1 |
| 5,301,824 | A | * | 4/1994 | Schoeller | 211/150 |
| 5,938,051 | A | * | 8/1999 | Scholler et al. | 211/150 |
| 5,988,777 | A | * | 11/1999 | Schoeller | 312/9.58 |
| 6,223,911 | B1 | * | 5/2001 | Weaver | 211/41.1 |
| 6,234,743 | B1 | * | 5/2001 | Strobel | 414/788.1 |
| 6,405,883 | B1 | * | 6/2002 | Schambach | 211/150 |

FOREIGN PATENT DOCUMENTS

| DE | 2930053 | A | * | 2/1981 |
| DE | G9408344.4 | | | 11/1994 |
| DE | 19641270 | | | 4/1998 |
| DE | 10000371 | | | 2/2000 |
| DE | 19831181 | C1 | * | 3/2000 |
| DE | 20005710 | U1 | | 10/2000 |
| DE | 10152046 | | | 5/2003 |
| EP | 192613 | A | * | 8/1986 |
| EP | 613837 | A1 | * | 9/1994 |
| EP | 1340697 | A1 | * | 9/2003 |

* cited by examiner

*Primary Examiner*—Eileen D. Lillis
*Assistant Examiner*—Gregory Adams
(74) *Attorney, Agent, or Firm*—Bachman & LaPointe, P.C.

(57) ABSTRACT

The invention relates to a stacking column for storing goods on top of each other or next to each other on pawls (1) which rotate about a rotational axis (2) from an idle position into a working position. The respective successive pawls (1) are mutually coupled by means of at least one link plate (9). In order to reduce the gap or pitch (T) between adjacent pawls (1), the at least one link plate (9) is angular, elbowed or arc-shaped.

11 Claims, 5 Drawing Sheets

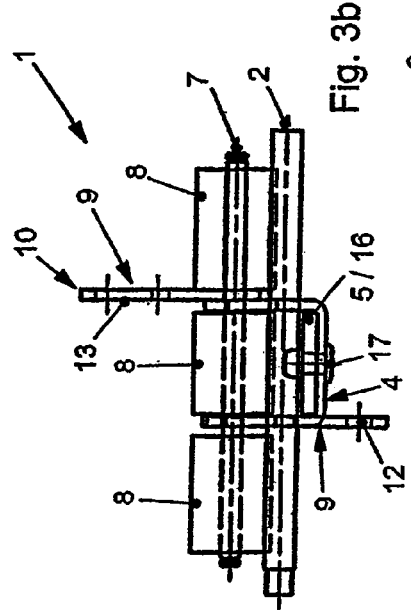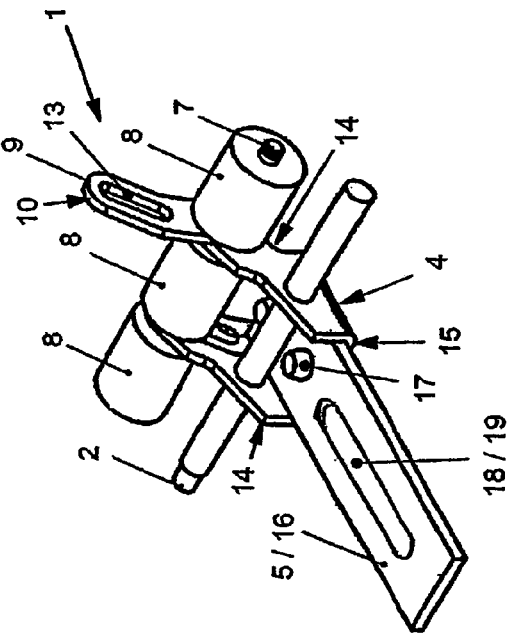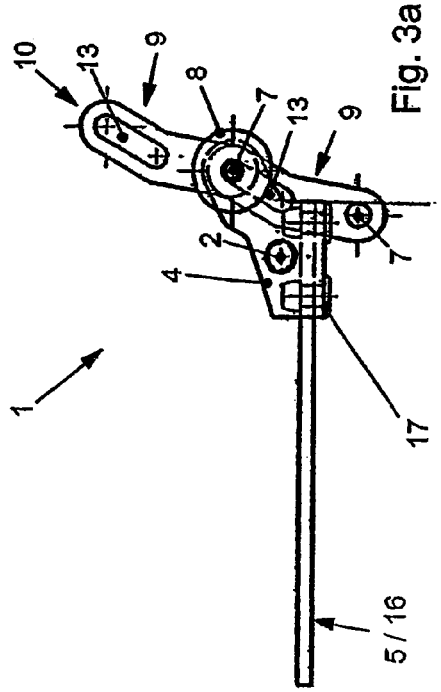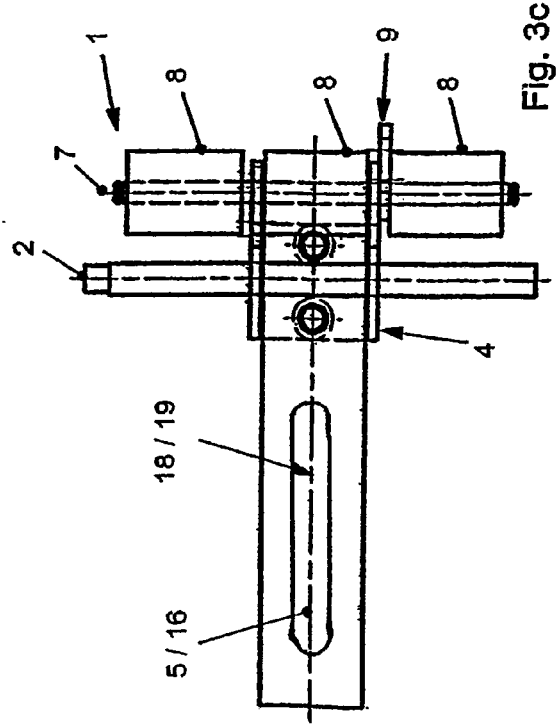

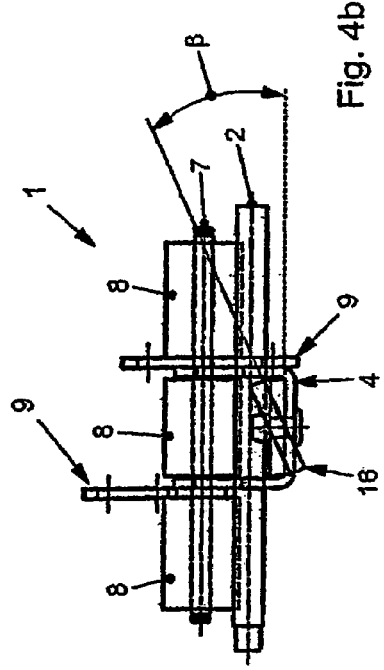
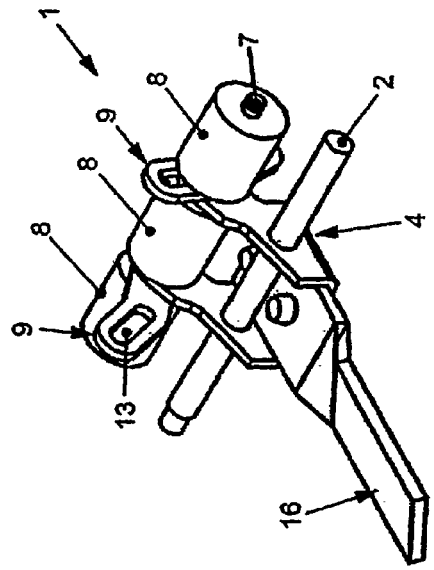
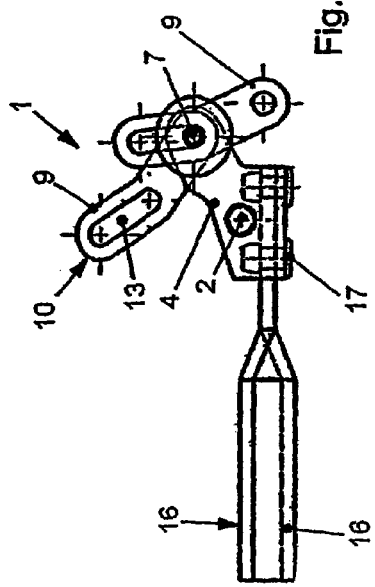
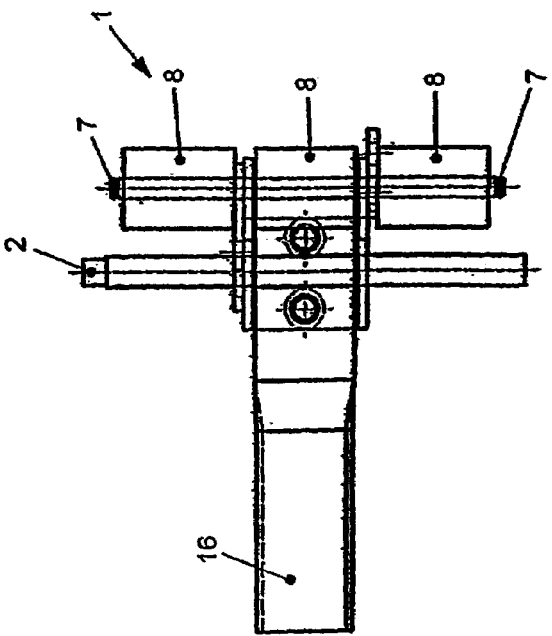

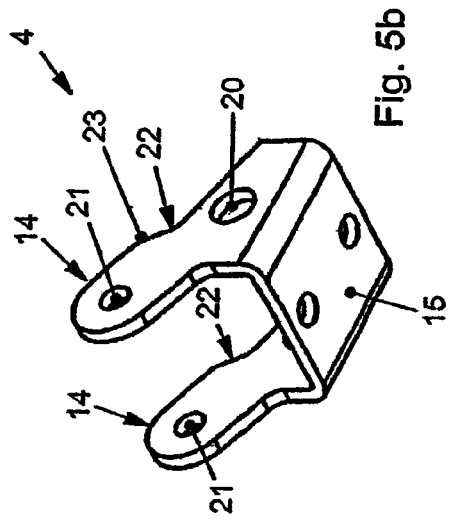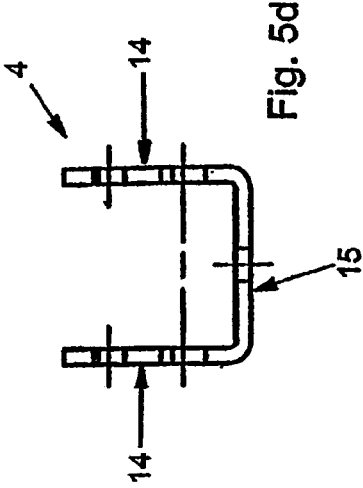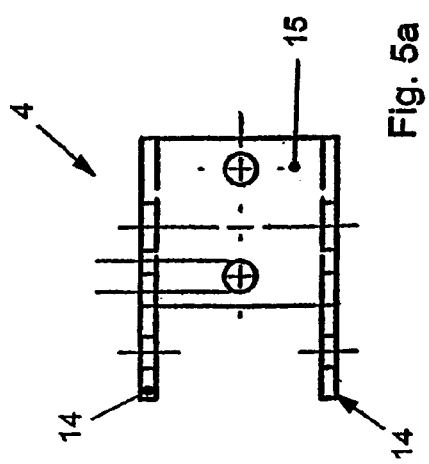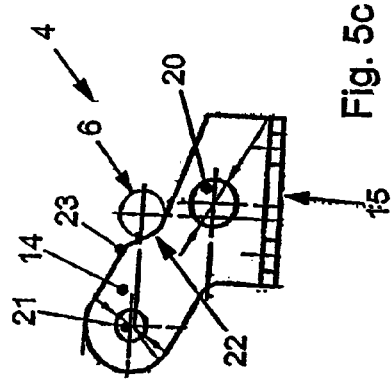

STACKING COLUMN

BACKGROUND OF THE INVENTION

The present invention relates to a stacking column for storing articles one beside the other or one on top of the other on pawls which rotate about an axis of rotation from a position of rest into a working position, the respective subsequent pawls being coupled to one another by means of at least one driver link plate.

Such stacking columns are known and available on the market in a variety of shapes and designs. For example, a stacking column for storing articles of the type mentioned at the beginning is disclosed and described in DE 196 47 578.3.

In said document, individual pawls are also arranged spaced apart one on top of the other so as to be rotatable with respect to one another, a rotary movement and pivoting movement of the individual pawls being coupled to one another by means of driver link plates in order to permit individual pawls, in particular extended pawls, to move back.

DE 100 00 371 A1 describes a grid system for accommodating components in a vertical position, in which components the individual latches or hooks for holding objects are connected to one another by means of linear rigid control levers with elongated holes.

DE 94 08 344.4 discloses a toggle lever for a stacking column for storing storable goods, in particular vehicle bodywork parts with a supporting arm which is assigned to an axis of rotation, a strip for holding the bodywork part being secured to the supporting arm.

DE 200 05 710 U1 discloses a latch lever for stacking columns having a counterweight which is formed directly from the lever itself.

DE 196 41 270 A1 describes a device for stacking and transporting shaped parts, the individual latches being constructed with axes of rotation and pin elements which engage in respective elongated holes of a side part.

The disadvantage in comparison with the stacking column described in said document is that a reduction of the pitch, i.e. a distance between two pawls with respect to one another, is not readily possible so that the pawl weights of the individual pawls as well as individual driver link plates impede one another. In particular for thin components of planar design it is advantageous that significantly more components can be accommodated in such stacking columns. For this purpose, the pitch must be considerably reduced.

If the pitch is reduced, for example the counterweights are in contact with one another so that the individual pawls cannot be moved along.

The smaller the pitch, the smaller a distance between a drilled hole and an elongated hole of the driver link plate, so that only a quite specific pitch can be obtained.

A different form of stacking columns dispenses with counterweights, in which case, instead of counterweights, springs are provided which restore the individual pawls. Such a solution is costly and problematic, which relates in particular to the spring forces. Such springs are prone to faults and easily move the articles to be stored out of the pawl region, which is also undesired. They are not self-locking.

SUMMARY OF THE INVENTION

The present invention is based on the object of providing a stacking column of the type mentioned at the beginning which eliminates the above-mentioned disadvantages and with which a pitch between two pawls which lie one beside the other and/or one on top of the other can easily and effectively be reduced in a cost-effective manner. In this context, self-locking of pawls which are extended in a working position is to be possible. In addition, such a stacking column is to be manufactured in extremely cost-effective fashion, and be operationally reliable and have a long service life.

The features, the features of the characterizing part of claim one and all the features of the independent patent claims bring about the solution of this object.

The method of operation of stacking columns is described in detail in DE 196 47 578.3 which is incorporated herein by reference. Reference is expressly made here to this document and for this reason a more detailed description of the method of operation is dispensed with.

The present invention discloses a stacking column for storing articles such as, for example, pieces of sheet metal, engine hoods, mud flaps or the like, in which it has proven particularly advantageous to give a driver link plate, which has a drilled hole and an elongated hole, an elbowed or arcuate or angled design.

This ensures that a pitch between two adjacent pawls can be reduced in such a way since in particular an end region of the driver link plate in which the elongated hole is provided can be moved out of an active region of a pawl lying above it. As a result, it is possible not only to reduce the weights of the individual pawls, which affects their size, but also to significantly decrease the pitch so that significantly more pieces of sheet metal can be accommodated in a stacking column, or significantly more pawls can be accommodated in the stacking column.

It has also proven advantageous to store the counterweights in and/or next to a pawl mount on a weight shaft, it also being the intention that the scope of the present invention will include mounting a multiplicity of counterweights thereon in order to reduce overall their diameters or overall size. As a result, a pitch of individual pawls which lie one on top of the other or one beside the other can also be reduced.

For the purpose of also reducing the diameters and possibly number of the counterweights it has proven advantageous to provide a supporting surface with breakthroughs and/or recesses. As a result, the necessary counterweight or counterweights can be reduced, which affects their overall size, diameters etc. This also contributes to permitting a pitch of adjacent pawls to be reduced significantly.

It has also proven advantageous in the present invention to provide, in the side walls of the pawl mount, in particular in an outer edge, a stop recess which interacts with a stop in a horizontal working position, and thus separate protection is also sought for this. The pitch of adjacent pawls can also be reduced by means of the stop recess.

The scope of the present invention is also intended to include the fact that the driver link plate can be arcuate, angled, or elbowed, in particular in the region of the elongated hole. The invention is not restricted to this. For example, the entire driver link plate can also be curved in the shape of a banana or in an arcuate shape.

BRIEF DESCRIPTION OF THE DRAWINGS

Further advantages, features and details of the invention emerge from the following description of preferred exemplary embodiments and with reference to the drawing; in which:

FIGS. 3a to 3d show various views of a pawl according to the invention for insertion in a stacking column.

FIGS. 4a to 4d show various views of a further exemplary embodiment of a further pawl;

FIGS. 5a to 5d show various views of a pawl mount.

DETAILED DESCRIPTION

Figure 1:
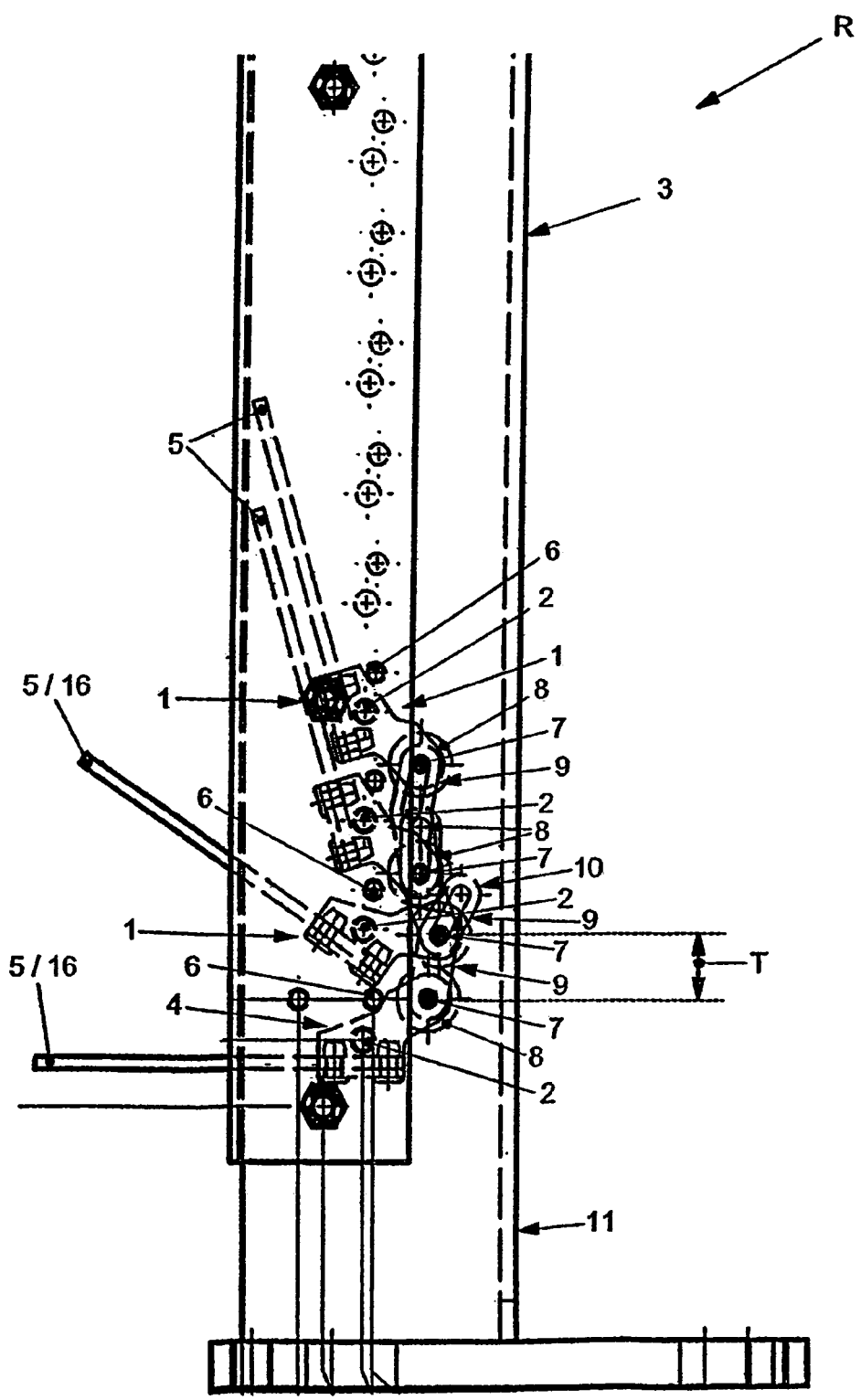
FIG. 1 shows a schematically represented side view of a stacking column according to the invention.

According to FIG. 1, a stacking column R according to the invention has a multiplicity of pawls 1 which are arranged one on top of the other or one beside the other and which can be pivoted by means of axes 2 of rotation in a housing 3 which is preferably U-shaped, a pawl mount 4 being secured in a horizontal working position of a supporting surface 5/16 by means of a stop 6 which is arranged in the housing 3. The individual pawls 1 or pawl mounts 4 which are arranged one on top of the other are also provided in each case with weight shafts 7 on which at least one counterweight 8 is seated.

An important factor in the present invention is that the individual pawls 1, in particular the pawls which lie one on top of the other or one beside the other, are coupled between the respective weight shafts 7 by means of at least one driver link plate 9.

Figures 2A, 2B:
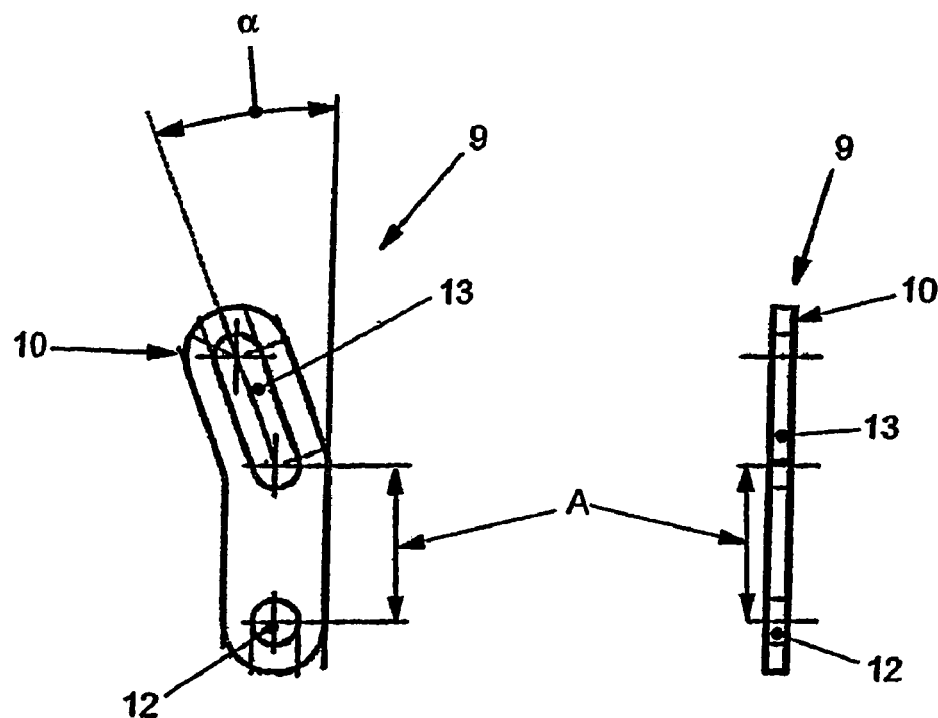
FIGS. 2a, 2b and 2c show plan and side views of a driver link plate according to the invention.
Figure 2C:
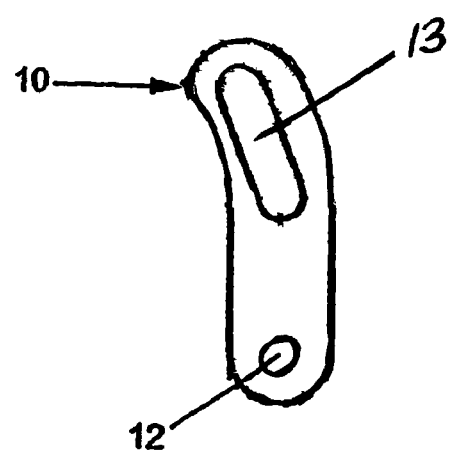

It has proven particularly advantageous in the present invention to make the driver link plate 9 elbowed, curved or angled, as indicated in FIG. 1 and illustrated in enlarged form in FIGS. 2a, 2b and 2c. As a result, a region 10 of the driver link plate 9 is moved out of a pivoting region or active region of the counterweight 8, lying above it, of a pawl 1 lying above it, in particular if the driver link plate 9, in particular its region 10, is oriented with respect to a rear side 11 of the housing 3. Said driver link plate 9 is moved or pivoted out of the active region of the counterweight 8 lying above it. FIGS. 2a and 2b show a driver link plate 9 which at one end adjoins a drilled hole 12 and an elongated hole 13 at a distance A, said elongated hole 13 ending in an end region 10. The elongated hole 13 includes a preferably acute angle α with respect to the base element of the driver link plate 9.

Starting from a specific distance A which may be smaller or larger, it is intended also to lie within the scope of the present invention that the elongated hole 13 is elbowed, for example, in an arcuate shape to a greater or less extent, or angled. This is important in the present invention since as a result the end region 10 is moved out of the active region of the pawl 1 lying above it. As a result, a pitch T can be significantly reduced. A pitch T is a distance between two adjacent pawls. As a result, a pitch T of less than 30 mm can be made as a distance between two pawls 1 and two adjacent supporting surfaces 5 in a working position.

In the exemplary embodiment according to FIG. 3d, a pawl 1 is shown in which an approximately U-shaped pawl mount 4 is provided. The axis 2 of rotation engages through its side walls 14. A supporting surface 5/16 is inserted into a base surface 15 of the pawl mount 4 (see also FIG. 3d), and is permanently connected thereto by means of at least one attachment element 17.

So that the size and/or number of the counterweights 8 which are seated on the weight shaft 7 can be reduced, and at the same time a large or a wide supporting surface 16 continues to be ensured, it has also proven advantageous in the present invention to provide at least one recess 18 and/or at least one breakthrough 19 in the supporting surface 16. As a result, the load-bearing force of the supporting surface 16 is not influenced but its weight is considerably reduced, which permits the counterweights 8 to be reduced. If the counterweights 8 are made smaller, a pitch, i.e. a distance between two pawls 1 which are arranged one on top of the other can also be reduced.

As is apparent in particular from FIGS. 3b and 3b, the weight shaft 7 of the pawl 1 which lies above it engages in the elongated hole 13 of a lower driver link plate 9, the next driver link plate 9 adjoining, in the way described above for the pawl 1 which lies above it (not illustrated here) on the same side or on the opposite side of the pawl mount 4, as illustrated in FIG. 3b, the driver link plate 9 being arcuate, angled or elbowed in the opposite direction to the support 16.

As is apparent in particular from FIGS. 4a to 4d, a further pawl 1 is described, which corresponds approximately to the type described above. The difference is that its supporting surface 16 is inclined by an angle β, as indicated in particular in FIGS. 4a and 4b. Here, the inclination of the supporting surface 16 through the angle β can be positive or negative. The invention is not restricted to this. Moreover, the pawl 1 is composed of the above-described components.

FIGS. 5a to 5b show, inter alia as perspective views, the pawl mount 4 which is formed from the base surface 15 and side walls 14 which respectively adjoin it, flush throughholes 20, 21 being provided for receiving the axis 2 of rotation and weight shaft 7 rows 7.

It has also proven particularly advantageous to provide, for a stop 6 as also indicated in FIGS. 1 and 5c, a stop recess 22 in an outer edge 23 of the side walls 14, which corresponds approximately to the contour of the stop 6. As a result, a stop takes place in a horizontal position of use of the pawl in a significantly more precise way, as a result of which a pitch T or an overall distance between two adjacent pawls 1 can also be reduced.

The invention claimed is:

1. A stacking column for storing articles one beside the other or one on top of the other, comprising pawls which rotate about an axis of rotation from a position of rest into a working position and having a weight axle, respective subsequent pawls being coupled to one another by at least one driver link plate assembly wherein, in order to reduce a pitch of adjacent pawls, the at least one driver link plate assembly comprises a first driver link plate and a second driver link plate, each of the first and second driver link plates having a round hole at a first end and an elongated hole at a second end, and wherein the first driver link plate is disposed on the weight axle with the weight axle extending through the round hole and the second driver link plate is disposed on the weight axle with the weight axle extending through the elongated hole.

2. The stacking column as claimed in claim 1, wherein the pawl has a pawl mount which is designed in the manner of a U through which the axis of rotation engages, and further through which the weight shaft engages parallel to the axis of rotation.

3. The stacking column as claimed in claim 2, wherein the pawl mount has side walls through which the weight shaft and the axis of rotation engage, each side wall being provided with a stop recess.

4. The stacking column as claimed in claim 2, wherein a supporting surface is formed at an angle with respect to a base surface of the pawl mount.

5. The stacking column as claimed in claim 1, wherein the at least one driver link plate has a strip-like cross section, and is curved in a region of the elongated hole, whereby the at least one driver link plate is mounted in a working position, out of an active region of a subsequent pawl lying above it.

6. The stacking column as claimed in claim 1, wherein the elongated hole is arranged at a distance from the round hole, and the driver link plate shape which is arcuate, angled or elbowed starts from the elongated hole.

7. The stacking column as claimed in claim 1, wherein the weight shaft of a lower pawl engages in the round hole of the second driver link plate, and the weight shaft of an upper pawl engages in the elongated hole of the first driver link plate, at least one of the first and second driver link plates being oriented so as to be curved, elbowed or arcuate with respect to a rear side of the housing.

8. A stacking column for storing articles one beside the other or one on top of the other, comprising pawls which rotate about an axis of rotation from a position of rest into a working position and having a weight axle, respective subsequent pawls being coupled to one another by means of at least one driver link plate assembly wherein, in order to reduce a pitch of adjacent pawls, the driver link plate assembly comprises a first driver link plate and a second driver link plate each having a round hole and at a first end and an elongated hole at a second end, wherein at least one of the first and second driver link plates has a shape that is at least one of angled, elbowed and arcuate in a region of the elongated hole, and wherein the first driver link plate is disposed on the weight axle with the weight axle extending through the round hole and the second driver link plate is disposed on the weight axle with the weight axle extending through the elongated hole.

9. A stacking column for storing articles one beside the other or one on top of the other, comprising pawls which rotate about an axis of rotation from a position of rest into a working position, respective subsequent pawls being coupled to one another by means of at least one driver link plate assembly wherein, in order to reduce a pitch of adjacent pawls, at least one counterweight is arranged on a weight shaft in at least one position selected from the group consisting of in the pawl and next to the pawl, wherein the at least one driver link plate assembly comprises a first driver link plate and a second driver link plate, each having a round hole at a first end and an elongated hole at a second end, and wherein the first driver link plate is disposed on the weight axle with the weight axle extending through the round hole and the second driver link plate is disposed on the weight axle with the weight axle extending through the elongated hole.

10. A stacking column for storing articles one beside the other or one on top of the other, comprising pawls which rotate about an axis of rotation from a position of rest into a working position, respective subsequent pawls being coupled to one another by means of at least driver link plate assembly wherein, in order to reduce a pitch of adjacent pawls, individual pawls are arranged one above the other or one next to the other in a housing in a central, left-aligned or right-aligned arrangement, at least one counterweight being provided in each case on a weight shaft in at least one position selected from the group consisting of in the pawl and next to the pawl, wherein the at least one driver link plate assembly comprises a first driver link plate and a second driver link plate, each having a round hole at a first end and an elongated hole at a second end, and wherein the first driver link plate is disposed on the weight axle with the weight axle extending through the round hole and the second driver link plate is disposed on the weight axle with the weight axle extending through the elongated hole.

11. A stacking column for storing articles one beside the other or one on top of the other, comprising pawls which rotate about an axis of rotation from a position of rest into a working position and having a weight axle, respective subsequent pawls being coupled to one another by means of at least one driver link plate assembly, wherein, in order to reduce a pitch of adjacent pawls and in order to reduce a counterweight, a supporting surface of the pawl is at least partially provided with recesses or breakthroughs, wherein the at least one driver link plate assembly comprises a first driver link plate and a second driver link plate, each having a round hole at a first end and an elongated hole at a second end, and wherein the first driver link plate is disposed on the weight axle with the weight axle extending through the round hole and the second driver link plate is disposed on the weight axle with the weight axle extending through the elongated hole.

* * * * *